(12) United States Patent
Tiemann et al.

(10) Patent No.: US 11,578,962 B2
(45) Date of Patent: Feb. 14, 2023

(54) INDUCTIVE POSITION MEASURING DEVICE

(71) Applicant: DR. JOHANNES HEIDENHAIN GmbH, Traunreut (DE)

(72) Inventors: Marc Oliver Tiemann, Waging am See (DE); Martin Heumann, Traunstein (DE); Alexander Frank, Traunstein (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 57 days.

(21) Appl. No.: 17/240,539

(22) Filed: Apr. 26, 2021

(65) Prior Publication Data
US 2021/0341278 A1  Nov. 4, 2021

(30) Foreign Application Priority Data
Apr. 29, 2020  (DE) .......................... 102020205398.7

(51) Int. Cl.
*G01B 7/00* (2006.01)
*G01B 7/30* (2006.01)
(Continued)

(52) U.S. Cl.
CPC .............. *G01B 7/003* (2013.01); *G01B 7/30* (2013.01); *G01D 5/2053* (2013.01); *G01D 5/2451* (2013.01)

(58) Field of Classification Search
CPC ........ G01B 7/003; G01B 7/30; G01D 5/2053; G01D 5/2451; G01D 2205/90; G01D 5/206
See application file for complete search history.

(56) References Cited

U.S. PATENT DOCUMENTS 4,879,508 A * 11/1989 Andermo ............. G01D 5/2415
340/870.37
5,233,294 A * 8/1993 Dreoni ............... H03K 17/9525
324/207.16
(Continued)

FOREIGN PATENT DOCUMENTS

DE      102012223037 A1   6/2014
EP         1014041 A1    6/2000

OTHER PUBLICATIONS

European Search Report issued in corresponding European Patent Application No. 21154472.1, dated Jul. 8, 2021, pp. 1-2.

*Primary Examiner* — Steven L Yeninas
(74) *Attorney, Agent, or Firm* — Carter, DeLuca & Farrell LLP

(57) ABSTRACT

An inductive position measuring device includes a scanning element and a scale element. The position measuring device is able to determine positions of the scanning element relative to the scale element in a first direction and in a second direction. The scale element includes graduation structures arranged next to one another along the first direction, and the graduation structures have a periodic characteristic with a second period length along the second direction. The scanning element has a first receiver track, a second receiver track, a third receiver track, and an excitation lead. Each of the three receiver tracks has two receiver circuit traces. The receiver circuit traces have a periodic characteristic with a first period length along the first direction, and the receiver tracks are arranged at an offset from one another in the second direction.

19 Claims, 3 Drawing Sheets

(51) Int. Cl.
    *G01D 5/20*     (2006.01)
    *G01D 5/245*     (2006.01)

(56)     References Cited

U.S. PATENT DOCUMENTS

| | | |
|---|---|---|
| 9,383,184 B2 | 7/2016 | Tiemann et al. |
| 2014/0103914 A1* | 4/2014 | Kusumi .................. G01B 7/14 |
| | | 324/207.21 |
| 2014/0167746 A1* | 6/2014 | Tiemann .................. G01B 7/30 |
| | | 324/207.17 |
| 2018/0274949 A1 | 9/2018 | Kubozono |
| 2019/0170494 A1* | 6/2019 | Tiemann ................ G01B 7/003 |
| 2019/0316936 A1* | 10/2019 | Mori .................... G01D 5/2086 |

* cited by examiner

INDUCTIVE POSITION MEASURING DEVICE

CROSS-REFERENCE TO RELATED APPLICATIONS

The present application claims priority to Application No. 10 2020 205 398.7, filed in the Federal Republic of Germany on Apr. 29, 2020, which is expressly incorporated herein in its entirety by reference thereto.

FIELD OF THE INVENTION

The present invention relates to an inductive position measuring device, e.g., for determining the position of a scanning element relative to a scale element both in a first direction and in a second direction.

BACKGROUND INFORMATION

For example, inductive position measuring devices may be used as angle encoders for the purpose of determining the angular position of two machine parts that are rotatable relative to each other. In inductive position measuring devices, excitation circuit leads and receiver tracks, e.g., in the form of circuit traces, may be applied on a shared, often multi-layer circuit board which, for example, is fixedly connected to a stator of an angle encoder. Arranged across from this circuit board is a scale element on which graduation structures are applied and which is connected to the rotor of the angle encoder in a torsionally fixed manner. When an electrical excitation current varying over time is applied to the excitation leads, signals that are a function of the angular position are generated in the receiver coils during the relative rotation between the rotor and the stator. These signals are further processed in an evaluation electronics.

Such inductive position measuring devices may be utilized as measuring devices for electrical drives, for the purpose of determining the relative movement or the relative position of corresponding machine parts. In this case, the generated angular position values are supplied to sequential electronics for actuating the drives via a corresponding interface system. In certain applications, it may be desirable not only to generate angular position values but also position values for a displacement or an offset in an axial direction.

In addition, certain position measuring devices allow for a two-dimensional measurement of positions in a plane.

German Patent Document No. 10 2012 223 037, and U.S. Patent Application Publication No. 2014/0167746, describe an inductive position measuring device, which is able to determine both angular positions and an axial offset. The axial offset or the axial position is ascertained with the aid of a circumferential groove between two graduation tracks. When using such a position measuring device, the axial offset can be determined only across a relatively small measuring distance.

SUMMARY

Example embodiments of the present invention provide a relatively precise and economical inductive position measuring device by which positions are able to be determined in two directions.

According to an example embodiment of the present invention, an inductive position measuring device includes a scanning unit and a scale element. The position measuring device is able to determine positions of the scanning element relative to the scale element both in a first direction and in a second direction. The scale element includes graduation structures, which are arranged next to one another along the first direction. Along a second direction, the graduation structures have a periodic characteristic with a second period length. The scanning element includes a first receiver track, a second receiver track, a third receiver track, and at least one excitation lead. Each of the three receiver tracks has two receiver circuit traces, which have a periodic characteristic along the first direction with a first period length $Px$. The three receiver tracks are arranged at an offset from one another in the second direction.

For example, the first direction may be a circumferential direction or a tangential direction. In this case, an angular position of the scale element relative to the scanning element with regard to a rotary or pivoting movement about an axis (of rotation) is able to be measured in the first direction by the position determination. The second direction may have an orthogonal orientation to the first direction, e.g., parallel to the axis (of rotation) about which the scale element is rotatable relative to the scanning element.

As an alternative, the position measuring device may also be configured so that it allows for a two-dimensional position determination in a plane, in which the first direction in the plane is, for example, oriented orthogonal to the second direction. In this case, the scale element may be arranged as a flat plate.

In general, the scanning element and the scale element are arranged opposite each other and set apart from each other by an air gap that extends in the axial or radial direction, for example. The receiver circuit traces may be arranged so that they have a phase offset (e.g., a 90° phase offset) from one another.

For example, the first receiver track is arranged at an offset from the adjacent second receiver track which amounts to a first trace offset $Pz12$ in the second direction, and trace offset $Pz12$ is not equal to n times the second period length $Dz$, with n being a natural number. That is, $Pz12 \neq n \cdot Dz$.

It is therefore excluded that two receiver tracks are situated at an offset from each other in the second direction that amounts to the second period length or to a multiple of the second period length.

In addition, the second receiver track may be arranged at an offset from the third receiver track that amounts to a second trace offset $Pz23$ in the second direction z, and the second trace offset $Pz23$ is not equal to n times the second period length $Dz$, with n being a natural number. That is, $Pz23 \neq n \cdot Dz$.

The comments regarding a respective trace offset $Pz12$, $Pz23$ relate to the center distances of corresponding receiver tracks in relation to the second direction exclusively.

In addition to the at least three receiver tracks, one or more further receiver tracks may be provided, for example, in order to detect a rotation of the scanning element relative to the scale element (Moire error detection). In this case, an additional receiver track may be situated at a distance from one of the at least three receiver tracks that is also equal to n times the second period length.

First trace offset $Pz12$ or second trace offset $Pz23$ may equal n times the second period length $Dz$ divided by a further natural number m, that is:

$$Pz12 = n \cdot Dz/m, \text{ with } n \neq m, \text{ or}$$

$$Pz23 = n \cdot Dz/m, \text{ with } n \neq m.$$

Furthermore, the further natural number m may equal to three, that is:

$$Pz12 = n \cdot Dz/3, \text{ with } n \neq 3, \text{ or}$$

$$Pz23 = n \cdot Dz/3, \text{ with } n \neq 3.$$

For example, first trace offset Pz12 may have the same magnitude as second trace offset Pz23, that is: Pz12=Pz23.

The graduation structures may be arranged periodically next to one another with a graduation period Dx along the first direction, graduation period Dx having a length that is similar in magnitude to first period length Px. The following applies, for example:

$$0.75 \cdot Dx \leq Px \leq 1.25 \cdot Dx, \text{ or}$$

$$0.90 \cdot Dx \leq Px \leq 1.10 \cdot Dx, \text{ or}$$

$$Dx = Px.$$

A periodic characteristic with regard to the graduation structures or with regard to the receiver circuit traces should be understood as a pattern that repeats according to a fixed distance in space (spatially periodic). For example, the graduation structures or receiver circuit traces may be arranged so that they have curved or arched characteristics and, for example, have no straight sections.

The graduation structures may have a sine-shaped or a sine-type characteristic along the second direction. An imaginary abscissa of the associated sine lines for the graduation structures would therefore extend in parallel with the second direction.

The graduation structures may be arranged in the form of webs and gaps or grooves. The length of a web and the length of a gap, in the first direction in each case, add up to a graduation period Dx or to the length of a graduation structure. Within a graduation period Dx, the length of the web may be greater than the length of the gap.

The receiver circuit traces may have a sine-shaped or a sine-type extension along the first direction.

The scale element may be arranged as an axially symmetrical body having a curved surface (lateral side, convex outer surface or concave inner surface) on which the graduation structures are provided, the scale element being rotatable relative to the scanning element about an axis that extends in parallel with the second direction, the first direction furthermore extending or being oriented in the circumferential direction. However, as an alternative, the axis may also extend in parallel with the first direction, in which case the second direction extends in the circumferential direction.

The scale element may be arranged as a cylindrical body, e.g., a hollow-cylindrical body.

The graduation structures may have different distances from the axis along the second direction. For example, the scale element may be arranged as a conical body or as a spherical body (having a barrel-type outer surface contour) and the graduation structures may be provided on the conical or spherical surfaces. In this type of configuration, a relative change in position between the scanning element and the scale element would be accompanied by a change in the signal amplitude, which could then additionally provide information in connection with the position with regard to the second direction.

Further features and aspects of example embodiments of the present invention are described in more detail with reference to the appended Figures.

DETAILED DESCRIPTION

Example embodiments of the present invention are described based on a position measuring device that is intended both for acquiring a position in a first direction x (corresponding to an angular position φ) and a position in a second direction z between a scanning element 1 (FIG. 2) and a scale element 2 or scale that is rotatable about an axis A. Axis A is oriented parallel to second direction z. First direction x may therefore also correspond to the circumferential direction.

Figure 1:
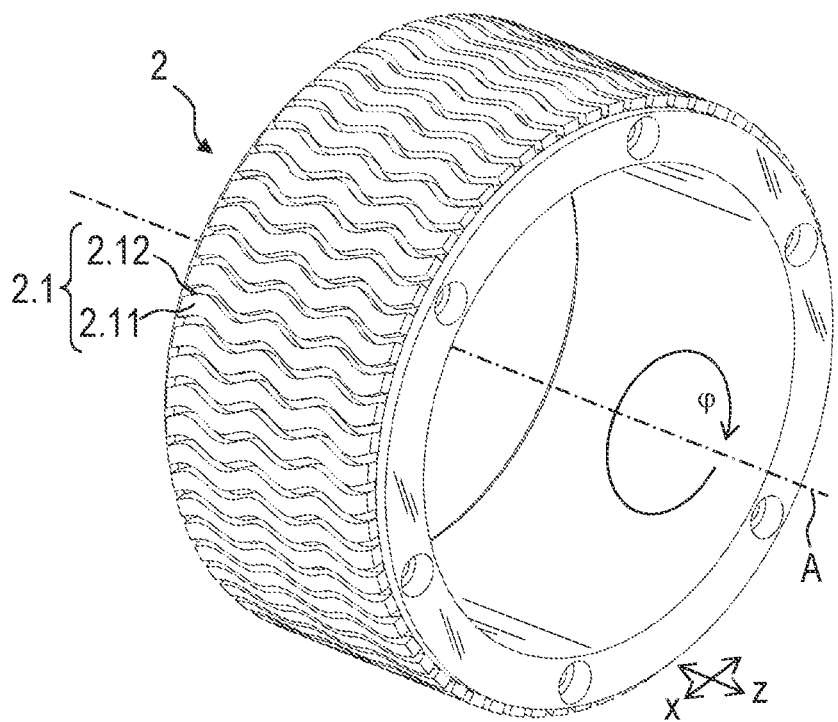
FIG. 1 is a perspective view of a scale element.
Figure 3:
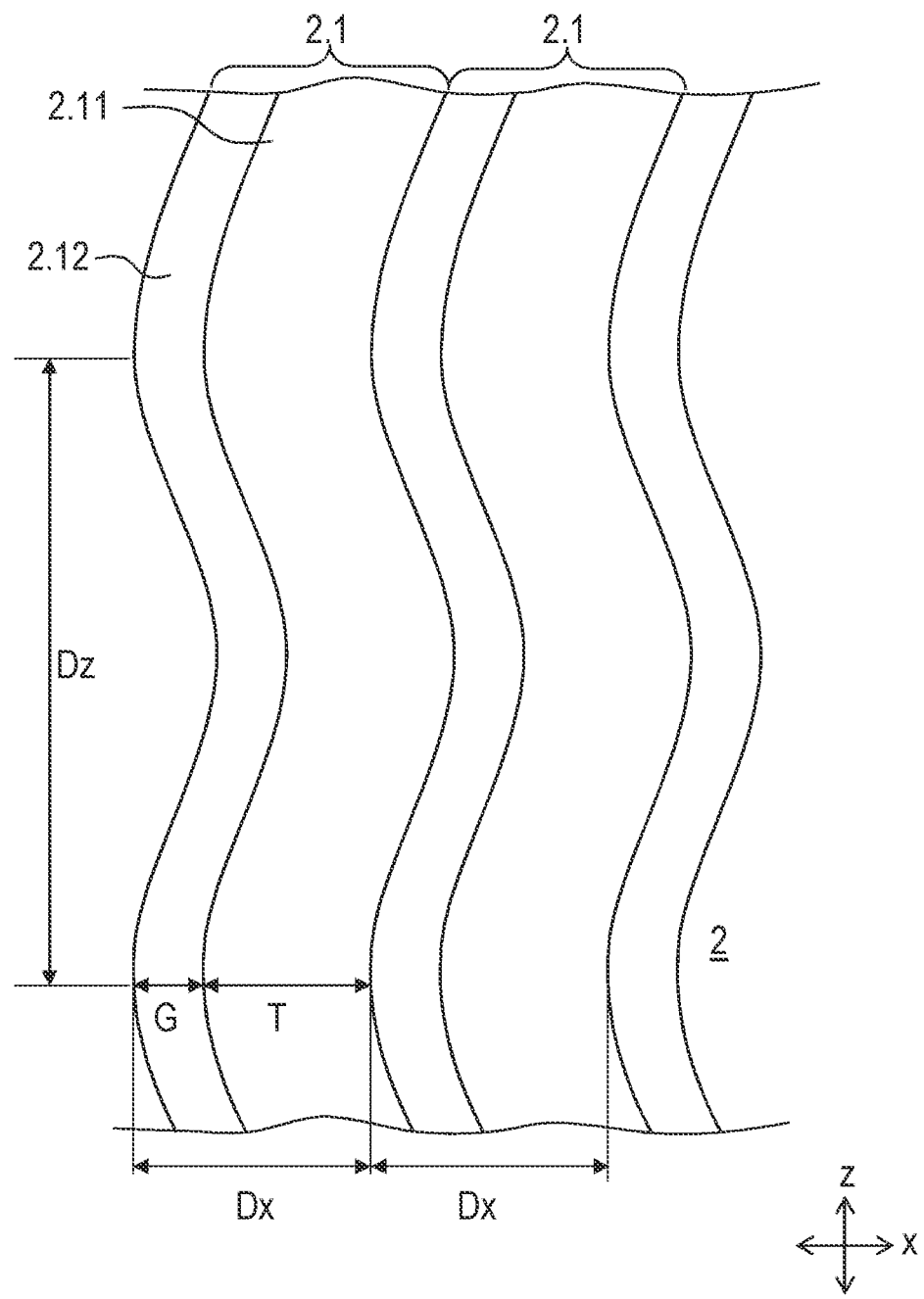
FIG. 3 is an enlarged view of the scale element.

FIG. 1 illustrates scale element 2, and FIG. 3 illustrates an enlarged, partial section of scale element 2. Scale element 2 is, for example, made from an aluminum material. Scale element 2 is, for example, arranged as a hollow cylinder or ring having axis A, on whose lateral surface graduation structures 2.1 are provided. Graduation structures 2.1 include webs 2.11 and interposed gaps 2.12 or grooves. Graduation structures 2.1 thus include a periodic series of webs 2.11 and gaps 2.12 arranged in alternation with regard to first direction x or with regard to the circumferential direction. Graduation period Dx (see, e.g., FIG. 3) of graduation structures 2.1 results from the sum of length T of one of webs 2.11 and length G of one of gaps 2.12, lengths T, G extending in first direction x or the circumferential direction. That is:

$$Dx = G + T.$$

Lengths T for all webs 2.11 have the same size as lengths G of gaps 2.12. In addition, for example, length T of web 2.11 within a graduation period Dx is greater than length G of the gap (that is, T>G).

Graduation structures 2.1, i.e., webs 2.11 and interposed gaps 2.12, have a spatially periodic characteristic, which has an substantially sine-shaped or sine type arrangement with regard to (e.g., along) second direction z. The abscissa of the associated sine lines extends along a line in parallel with axis A or in second direction z. For example, each graduation structure 2 passes through multiple full sine periods, and each graduation structure 2 has a second period length Dz.

Figure 2:
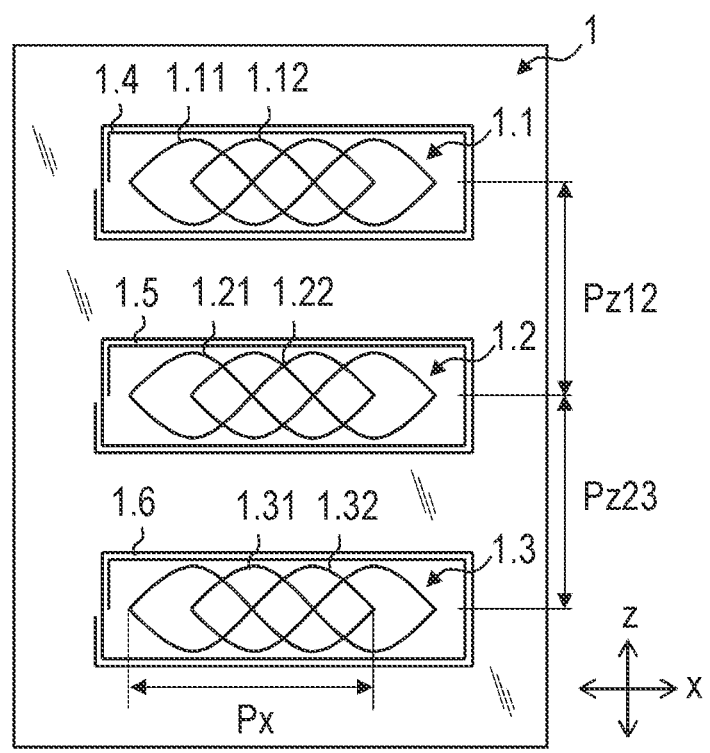
FIG. 2 is a plan view of a scanning element.

Scanning element 1, as illustrated in FIG. 2, is arranged as a circuit board, which includes multiple layers and is used for scanning scale element 2. Scanning element 1 has a first receiver track 1.1, a second receiver track 1.2, and a third receiver track 1.3. Each of the three receiver tracks 1.1, 1.2, 1.3 includes two receiver circuit traces 1.11, 1.12, 1.21, 1.22, 1.31, 1.32. In addition, scanning element 1 has excitation leads 1.4, 1.5, 1.6, which enclose receiver circuit traces 1.11, 1.12, 1.21, 1.22, 1.31, 1.32. Moreover, receiver circuit traces 1.11, 1.12, 1.21, 1.22, 1.31, 1.32 extend in different planes with through-platings so that undesired short circuits at junction points are avoided. In the illustrated exemplary embodiment, at least two layers are provided in the circuit board structure. Receiver circuit traces 1.11, 1.12, 1.21, 1.22, 1.31, 1.32 have a spatially periodic characteristic, which has a substantially sine-shaped or sine type arrangement. The abscissa of the associated sine lines extends along a line in parallel with first direction x. Trace offset Pz12, Pz23 between adjacent receiver tracks 1.1, 1.2, 1.3 corresponds to the distance of the associated abscissas, i.e., the center distances. For, each receiver circuit trace 1.11, 1.12, 1.21, 1.22, 1.31, 1.32 extends through a full sine period having a first period length Px. First period length Px may have the same magnitude as graduation period Dx. That is:

$$Px=Dx=T+G.$$

Receiver circuit traces 1.11, 1.12, 1.21, 1.22, 1.31, 1.32 associated with the same receiver track 1.1, 1.2, 1.3 are arranged at an offset from one another along first direction x. The particular receiver circuit traces 1.11, 1.12; 1.21, 1.22; 1.31, 1.32 arranged in one and the same receiver track 1.1, 1.2, 1.3 (that is to say, receiver circuit traces 1.11, 1.12 of first receiver track 1.1, receiver circuit traces 1.21, 1.22 of second receiver track 1.2, and receiver circuit traces 1.31, 1.32 of third receiver track 1.3) are, for example, arranged at an offset from one another amounting to ¼ of the full sine period (π/2 or 90° along first direction x). Receiver circuit traces 1.11, 1.12, 1.21, 1.22, 1.31, 1.32 are electrically interconnected so that they are effectively able to supply signals offset by 90° in their phases with regard to the position determination in first direction x.

First receiver track 1.1 is arranged at a first trace offset Pz12 from adjacent second receiver track 1.2 in second direction z. In the same manner, second receiver track 1.2 is arranged at a second trace offset Pz23 from adjacent third receiver track 1.3 in second direction z. The first trace offset Pz12 between first receiver track 1.1 and second receiver track 1.2 as well as second trace offset Pz23 between second receiver track 1.2 and third receiver track 1.3 may have the same magnitude (i.e., Pz12=Pz23). In all other respects, as illustrated in FIGS. 2 and 4, first trace offset Pz12 and second trace offset Pz23 correspond to the distances between the centers (center distances) of receiver tracks 1.1, 1.2, 1.3 in second direction z.

Adjacent receiver tracks 1.1, 1.2, 1.3 are therefore arranged at an offset from one another in second direction z, the offset amounting to a trace offset Pz12, Pz23 in each case. Both first trace offset Pz12 and second trace offset Pz23 may amount to one third of second period length Dz, that is:

$$Pz12=Dz/3=Pz23.$$

Figure 4:
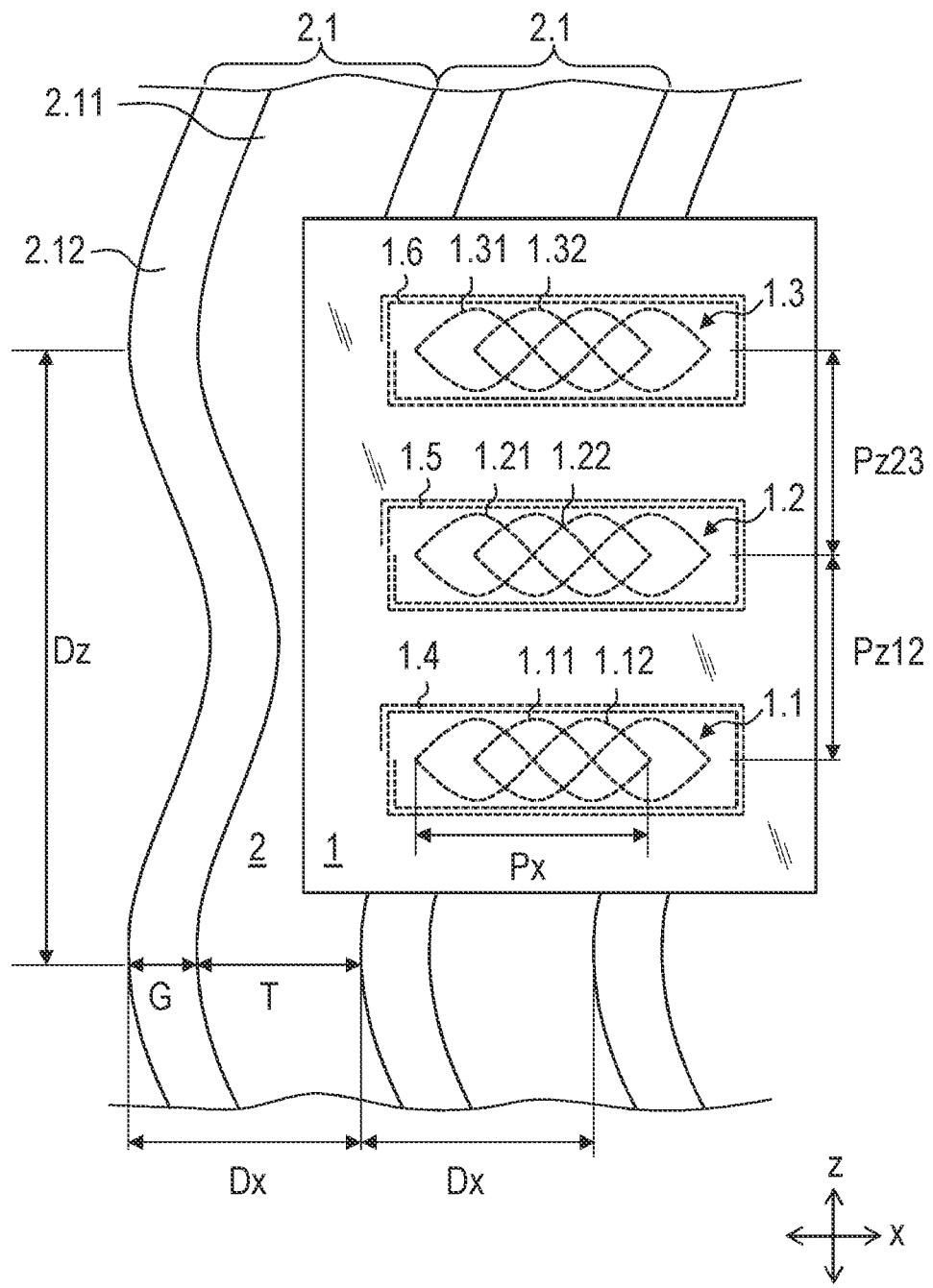
FIG. 4 is an enlarged view of the scale element together with the scanning element.

In the assembled state, illustrated in FIG. 4, scanning element 1 and scale element 2 are arranged opposite each other with a radial clearance or a radial air gap so that a signal as a function of the respective angular position is able to be generated in receiver circuit traces 1.11, 1.12, 1.21, 1.22, 1.31, 1.32 by induction effects by a relative rotation between scale element 2 and scanning element 1. A precondition for the generation of corresponding signals is that excitation leads 1.4, 1.5, 1.6 generate an electromagnetic excitation field that varies over time in the region of the scanned graduation structures. Excitation leads 1.4, 1.5, 1.6 may be arranged as a plurality of plan-parallel individual circuit traces through which a current flows. Scanning element 1 has an electronic circuit, which, for example, includes an ASIC component. This electronic circuit of scanning element 1 operates not only as an evaluation element but also as an exciter control element under whose control the excitation current is generated, which flows through excitation leads 1.4, 1.5, 1.6 or through the individual circuit traces. Excitation leads 1.4, 1.5, 1.6 thus are energized by one and the same exciter control element.

When excitation leads 1.4, 1.5, 1.6 are energized, an electromagnetic field oriented in the form of a tube or cylinder results around respective excitation lead 1.4, 1.5, 1.6. The field lines of the resulting electromagnetic field extend around excitation leads 1.4, 1.5, 1.6 in the form of concentric circles, the direction of the field lines depending, for example, in a conventional manner, on the current direction in excitation leads 1.4, 1.5, 1.6. In the region of webs 2.11, eddy currents are induced so that a modulation of the field as a function of angular position φ is achieved. Accordingly, relative angular position φ is able to be measured by receiver tracks 1.1, 1.2, 1.3. The pairs of receiver circuit traces 1.11, 1.12, 1.21, 1.22, 1.31, 1.32 are arranged within their receiver tracks 1.1, 1.2, 1.3 such that they supply signals having a 90° offset in their phases in each case so that a determination of the direction of rotation is able to take place as well. However, ascertained angular position φ of a single receiver track 1.1, 1.2, 1.3 ascertained in this manner generally includes undesired substantial errors, which are corrected or eliminated by the measurement with the aid of further receiver tracks 1.1, 1.2, 1.3, for example, by averaging.

However, receiver tracks 1.1, 1.2, 1.3 not only detect the relative position in first direction x or angular position φ but also the relative position between scale element 2 and scanning element 1 in second direction z. For this purpose, the respective individually measured values of receiver tracks 1.1, 1.2, 1.3 are linked with the (corrected) angular position φ in each case, which is determined from all three receiver tracks 1.1, 1.2, 1.3.

As a result, the position measuring device makes it possible to detect a relative position of scale element 2 in second direction z, which is oriented parallel to axis A, using the particular excitation leads 1.4, 1.5, 1.6 and receiver tracks 1.1, 1.2, 1.3 by which angular position φ is ultimately detectable as well.

What is claimed is:

1. An inductive position measuring device, comprising:
   a scanning element including a first receiver track, a second receiver track, a third receiver track, and an excitation lead, each receiver track including two receiver circuit traces having a periodic characteristic along a first direction with a first period length, the receiver tracks being arranged at an offset from one another in a second direction; and
   a scale element including graduation structures arranged next to one another along the first direction, the graduation structures having a periodic characteristic with a second period length along the second direction;
   wherein the position measuring device is adapted to determine positions of the scanning element in the first direction and in the second direction; and
   wherein the first receiver track is arranged at an offset from the second receiver track amounting to a first trace offset in the second direction, and the first trace offset is not equal to n times the second period length, n being a natural number.

2. The inductive position measuring device according to claim 1, wherein the second receiver track is arranged at an offset from the third receiver track amounting to a second trace offset in the second direction, and the second trace offset is not equal to n times the second period length.

3. The inductive position measuring device according to claim 2, wherein the first trace offset and/or the second first trace is equal to n times the second period length divided by a further natural number m that is not equal to n.

4. The inductive position measuring device according to claim 3, wherein m=3.

5. The inductive position measuring device according to claim 1, wherein the second receiver track is arranged at an offset from the third receiver track amounting to a second trace offset in the second direction, and the second trace offset is not equal to m times the second period length, m being a natural number.

6. The inductive position measuring device according to claim 1, wherein the first trace offset is equal to n times the second period length divided by a further natural number m that is not equal to n.

7. The inductive position measuring device according to claim 6, wherein m=3.

8. The inductive position measuring device according to claim 1, wherein and the second receiver track has a second trace offset relative to the third receiver track in the second direction, the first trace offset being equal in magnitude to the second trace offset.

9. The inductive position measuring device according to claim 1, wherein the graduation structures are arranged periodically next to one another along the first direction with a graduation period, the following relationship being satisfied:

$$0.75 \cdot Dx \leq Px \leq 1.25 \cdot Dx;$$

Dx representing the graduation period, Px representing the first period length.

10. The inductive position measuring device according to claim 1, wherein the graduation structures are arranged as webs and gaps.

11. The inductive position measuring device according to claim 10, wherein the first period length is equal to the sum of a length of one of the webs and a length of one of the gaps.

12. The inductive position measuring device according to claim 11, wherein the length of the one of the webs is greater than the length of the one of the gaps.

13. The inductive position measuring device according to claim 1, wherein the receiver circuit traces are sinusoidal along the first direction.

14. The inductive position measuring device according to claim 1, wherein the scale element is rotatable relative to the scanning element about an axis parallel to the second direction, the first direction extending in a circumferential direction.

15. The inductive position measuring device according to claim 14, wherein the scale element is arranged as a cylindrical body.

16. An inductive position measuring device, comprising:
a scanning element including a first receiver track, a second receiver track, a third receiver track, and an excitation lead, each receiver track including two receiver circuit traces having a periodic characteristic along a first direction with a first period length, the receiver tracks being arranged at an offset from one another in a second direction; and
a scale element including graduation structures arranged next to one another along the first direction, the graduation structures having a periodic characteristic with a second period length along the second direction;
wherein the position measuring device is adapted to determine positions of the scanning element in the first direction and in the second direction; and
wherein the second receiver track is arranged at an offset from the third receiver track amounting to a second trace offset in the second direction, and the second trace offset is not equal to n times the second period length, n being a natural number.

17. The inductive position measuring device according to claim 16, wherein the second trace offset is equal to n times the second period length divided by a further natural number m that is not equal to n.

18. The inductive position measuring device according to claim 17, wherein m=3.

19. An inductive position measuring device, comprising:
a scanning element including a first receiver track, a second receiver track, a third receiver track, and an excitation lead, each receiver track including two receiver circuit traces having a periodic characteristic along a first direction with a first period length, the receiver tracks being arranged at an offset from one another in a second direction; and
a scale element including graduation structures arranged next to one another along the first direction, the graduation structures having a periodic characteristic with a second period length along the second direction;
wherein the position measuring device is adapted to determine positions of the scanning element in the first direction and in the second direction; and
wherein the graduation structures are sinusoidal along the second direction.

* * * * *